United States Patent [19]

Imanari

[11] Patent Number: 4,720,182
[45] Date of Patent: Jan. 19, 1988

[54] ZOOM LENS CAPABLE OF EFFECTING A MACRO OPERATION

[75] Inventor: Hitoshi Imanari, Kawasaki, Japan

[73] Assignee: Nippon Kogaku K.K., Tokyo, Japan

[21] Appl. No.: 793,266

[22] Filed: Oct. 31, 1985

[30] Foreign Application Priority Data

Nov. 8, 1984 [JP] Japan .............................. 59-235487
Nov. 8, 1984 [JP] Japan .............................. 59-235488

[51] Int. Cl.⁴ .......................... G02B 7/10; G02B 15/00
[52] U.S. Cl. .................................................... 350/430
[58] Field of Search ............................ 350/430, 429

[56] References Cited

U.S. PATENT DOCUMENTS

| | | | |
|---|---|---|---|
| 4,114,984 | 9/1978 | Muryoi | 350/430 |
| 4,247,169 | 1/1981 | Uesugi | 350/430 |
| 4,322,150 | 3/1982 | Kamata et al. | 350/430 |
| 4,421,389 | 12/1983 | Muryoi | 350/430 |
| 4,448,496 | 5/1984 | Isobe et al. | 350/430 |
| 4,506,959 | 3/1985 | Hama | 350/430 |

*Primary Examiner*—Bruce Y. Arnold
*Assistant Examiner*—Loha Ben
*Attorney, Agent, or Firm*—Shapiro and Shapiro

[57] ABSTRACT

A zoom lens assembly comprises an optical system forming an optic axis and having at least one lens group moved along the optic axis for zooming and for focusing on an object to be photographed at a close-up distance less than a normal object distance. A barrel member is coupled to the lens group and is rotatable about the optic axis to move the lens group along the optic axis. An operating member is moved along the optic axis for a zooming operation and is rotated about the optic axis for a focusing operation. The operating member has a close-up operation area in which the operating member is rotated during focusing on an object at less than normal object distance. The barrel member is rotated in response to the zooming operation of the operating member. A connecting device is provided between the barrel member and the operating member and couples the barrel member to the operating member for rotation therewith when the operating member is rotated into the close-up operation area. In a specific embodiment, the optical system includes another lens group movable along the optic axis for zooming and for focusing at a normal object distance, but not movable along the optic axis during focusing at a close-up distance.

11 Claims, 11 Drawing Figures

F I G. 1
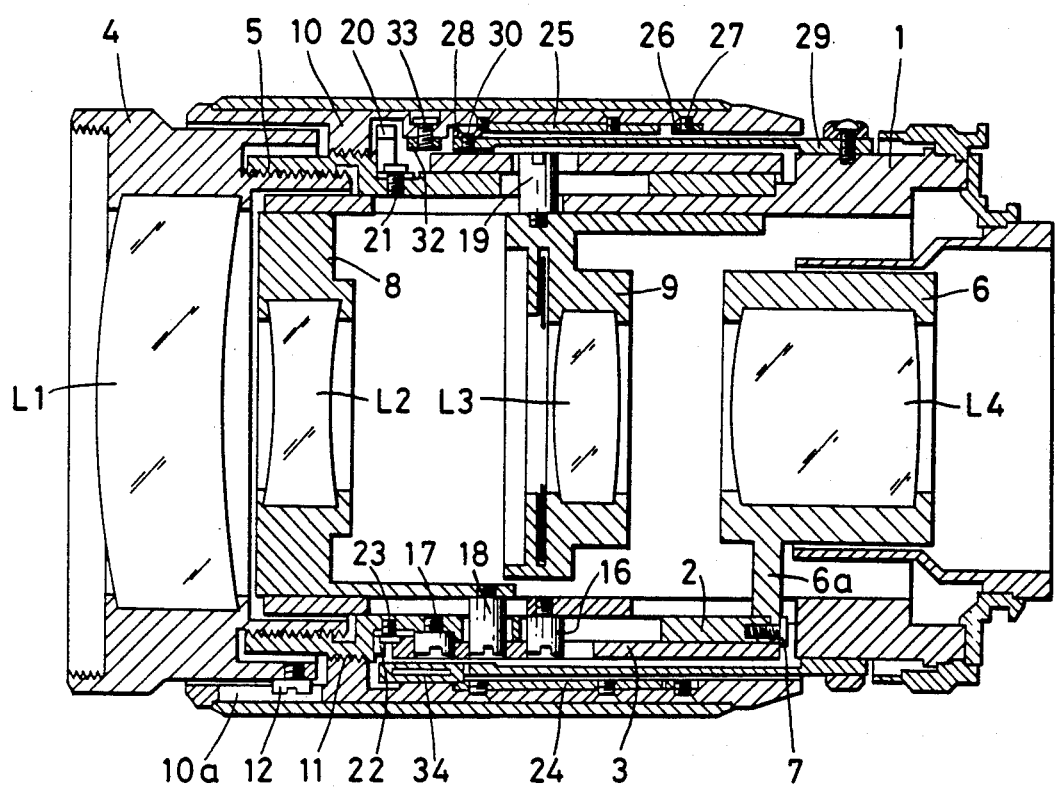

F I G. 2
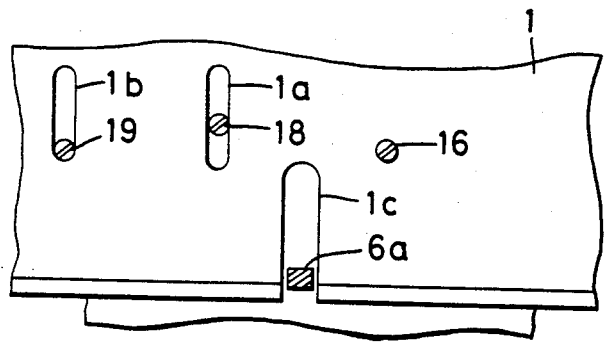
F I G. 3
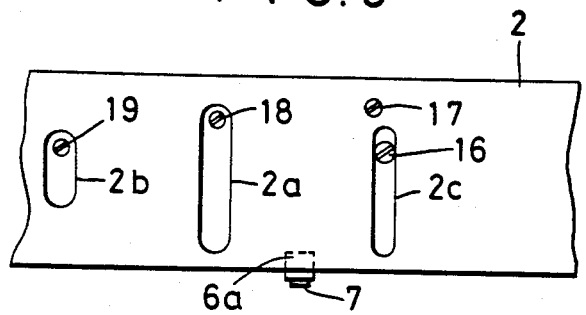
F I G. 4
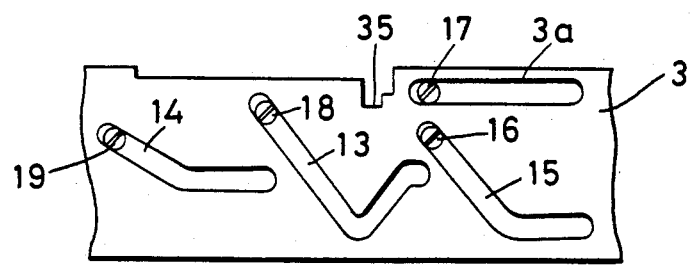

ZOOM LENS CAPABLE OF EFFECTING A MACRO OPERATION

BACKGROUND OF THE INVENTION

1. Field of the Invention

This invention relates to a zoom lens capable of effecting a macro (close-up) operation, and in particular to the mechanical operating device thereof.

2. Description of the Prior Art

Various focusing devices of zoom lenses capable of focusing to the so-called macro area just beyond the close distance position in the normal photography area which enables zoom magnification change have been proposed and are already known.

However, in any of the above-described zoom lenses, there are provided both a focusing member for the normal photography area and a focusing operating member for the macro area (an operating member serving also for zoom magnification change). Therefore, in the known focusing devices of this type, when photography is to be continuously effected from the normal photography area to the macro area or from the macro area to the normal photography area, the two operating members must be operated cooperatively. Accordingly, the operation for focusing is complicated and quick focusing cannot be accomplished and in addition, the focusing is discontinuous and this leads to the possibility of missing the opportunity to photograph an object in motion whose distance gradually changes.

A zoom lens in which zoom magnification change and focusing from the normal photography area to the macro area can be accomplished by an operating member is also known, for example, from U.S. Pat. No. 4,448,496. In the above-described prior art, there is shown a zoom lens in which focusing in the normal photography area is accomplished by rotating an operating member and subsequently focusing in the macro area can be accomplished by further rotation of the operating member beyond the normal photography area. However, back-lash is liable to occur in the connecting mechanism for macro photography change-over, and in the macro area wherein any slight adjustment error may lead to an extreme out-of-focus condition, focusing becomes unstable and inaccurate. Further, during focusing in the macro area, the lens for normal area adjustment is also greatly moved axially beyond the close distance position and therefore, not only the lens aperture becomes great, but also the aberrations; particularly, the curvature of image field of the optical system is increased.

SUMMARY OF THE INVENTION

It is an object of the present invention to provide an improved zoom lens assembly which eliminates the above-noted disadvantages peculiar to the zoom lens according to the prior art.

It is another object of the present invention to provide a zoom lens assembly provided with a macro photography change-over device in which zooming and focusing from the normal photography area to the macro area can be accomplished by an operating member and moreover the change-over between focusing in the normal photography area and focusing in the macro area can be accomplished very smoothly.

It is still another object of the present invention to provide the focusing device of a zoom lens which can quickly and easily accomplish focusing in the macro area subsequently to focusing in the normal photography area and moreover can well correct aberrations, particularly curvature of image field which is liable to increase in the macro area.

BRIEF DESCRIPTION OF THE DRAWINGS

FIG. 1 is a longitudinal cross-sectional view showing an embodiment of the present invention.

FIGS. 2 to 4 are developed views of the lens barrel portion of the embodiment of FIG. 1, FIG. 2 showing a fixed lens barrel, FIG. 3 showing a movable barrel, and FIG. 4 showing a cam barrel.

DESCRIPTION OF THE PREFERRED EMBODIMENTS

Figure 5:
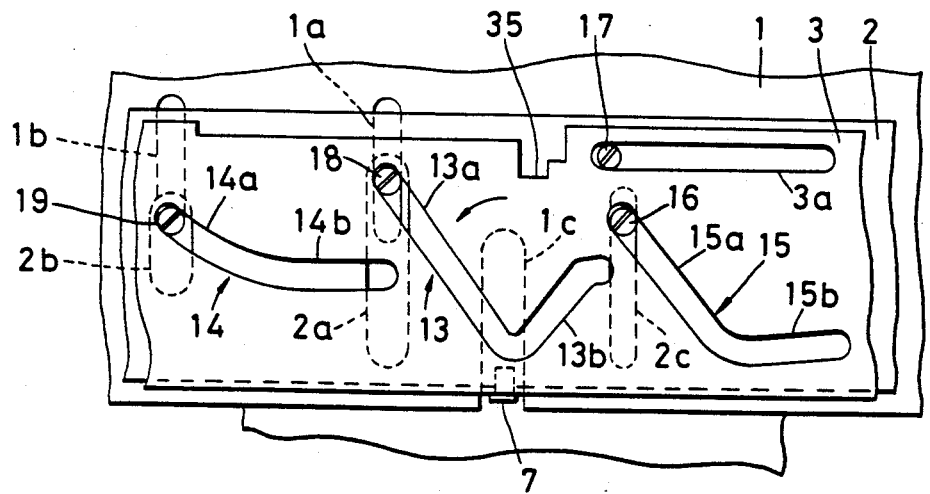
FIG. 5 is a developed view showing a state in which the barrels shown in FIGS. 2 to 4 are overlapped.

Referring to FIG. 1, a zoom lens optical system is comprised of a positive first lens group L1, a negative second lens group L2, a positive third lens group L3 and a positive fourth lens group L4. A movable barrel 2 is slidably fitted and supported on a fixed lens barrel 1 to which the lens mount of the camera body side, not shown, may be coupled, and a cam barrel 3 is rotatably supported on the outer periphery of the movable barrel 2. A first lens barrel 4 for holding the first lens group L1 is threadably engaged with one end of the movable barrel 2 through a helicoid thread 5, and a fourth lens barrel 6 for holding the fourth lens group L4 is secured to the other end of the movable barrel 2 by a small screw 7. A second lens barrel 8 for holding the second lens group L2 and a third lens barrel 9 for holding the third lens group L3 are slidably fitted and supported on the inner periphery of the fixed lens barrel 1.

An operating member 10 is threadably engaged with a portion of the movable barrel 2 through a thread 11 and has a straight groove 10a extending in the direction of the optic axis.

A pin 12 studded in the first lens barrel 4 fits in the straight groove 10a and transmits the rotation of the operating member 10 to the lens barrel 4.

The fixed lens barrel 1, as shown in FIG. 2, has straight guide grooves 1a, 1b extending in the direction of the optical axis and an escape groove 1c which extends in the direction of the optic axis and through which the handle portion 6a of the lens barrel 6 extends. The movable barrel 2, as shown in FIG. 3, is provided with two escape grooves 2a, 2b elongated in the direction of the optic axis and a straight guide groove 2c extending in the direction of the optic axis. Further, the cam barrel 3, as shown in FIG. 4, is provided with a first cam slot 13 for sliding the lens barrel 8 therein, a second cam slot 14 for sliding the lens barrel 9 therein, and a third cam slot 15 engaged by a fixed pin 16 studded in the fixed lens barrel 1 through the straight guide groove 2c of the movable barrel 2. The cam barrel 3 is also provided with a sliding slot 3a which extends in the circumferential direction (to the left and right as viewed in FIG. 4) and which is slidably engaged by an interlocking pin 17 studded in the movable barrel 2. Further, a sliding pin 18 engaged with the cam slot 13 extends through the escape groove 2a of the movable lens barrel 2 and the straight guide groove 1a of the fixed lens barrel and is secured to the lens barrel 8, and a sliding pin 19 engaged with the cam slot 14 extends through the escape groove 2b of the movable barrel 2 and the straight guide groove 1b of the fixed lens barrel 1 and is secured to the lens barrel 9.

FIG. 5 is a developed view showing a state in which the fixed barrell, the movable barrel 2 and the cam barrel 3 are combined together, and like FIG. 1, it shows the state when the zoom lens optical system L1-L4 is focused to a wide angle (short focal length) position and infinity.

Figure 6:
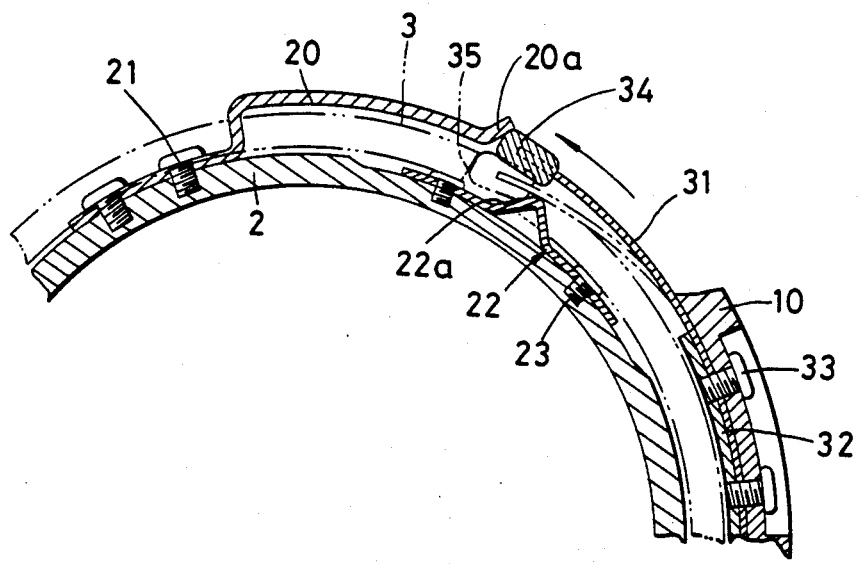
FIG. 6 is an enlarged cross-sectional view of a connecting device in the embodiment of FIG. 1.
Figure 7:
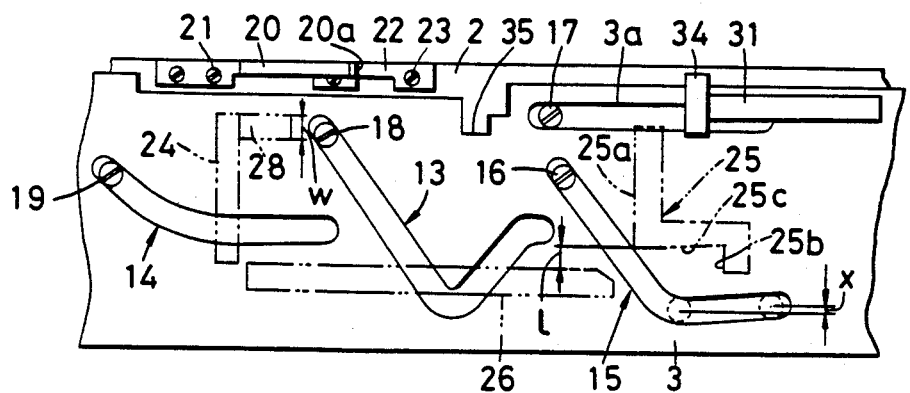
FIGS. 7 to 10 are developed views of the connecting device, the operating member controlling portion and the cam barrel in the embodiment of FIG. 1, FIG. 7 showing the focal length and the focusing position adjusted to the wide angle and infinity, respectively, FIG. 8 showing the focal length and the focusing position adjusted to the telephoto and infinity, respectively, FIG. 9 showing the focal length and the focusing position adjusted to the telephoto and the normal close distance, respectively, and FIG. 10 showing the focal length and the focusing position adjusted to the telephoto and the macro close distance, respectively.

FIG. 6 is an enlarged cross-sectional view showing a connecting device portion coupling the operating member 10 and the cam barrel 3, and FIG. 7 is a developed view of the connecting device portion shown in FIG. 6 and the movement controlling portion of the operating member 10 and the cam barrel 3. The movement controlling portion is indicated by dot-and-dash lines.

As shown in FIGS. 6 and 7, a keeper plate 20 is fixed to the movable barrel 2 by means of small screws 21, and a releasing plate 22 having a protruding inclined surface 22a near the inclined surface 20a of the fore end of the keeper plate 20 is secured to the movable barrel 2 by means of small screws 23. As shown in FIGS. 1 and 7, a first rotation limiting plate 24 for controlling the infinity position in the normal photography area, a second rotation limiting plate 25 for limiting the rotations at the close distance in the normal photography area (hereinafter referred to as the "normal close distance") and the close distance in the macro are (hereinafter referred to as the "macro close distance") and a rectilinear movement limiting plate 26 for controlling the longest focal length position of the operating member 10 (hereinafter referred to as the "telephoto position") are secured to the inner peripheral surface of the operating member 10 by means of small screws 27. A limiting piece 28 bearing against these limiting plates 24, 25 and 26 is secured to one end of a cover barrel 29 provided on the outer periphery of the fixed barrel 1, by means of small screws 30. The width w of the limiting piece 28 is slightly narrower than the spacing l (see FIG. 7) between the lower end 25c of the bearing surface 25a of the limiting plate 25 and the upper side surface of the limiting plate 26.

Further, as shown in FIG. 6, a circumferentially extending long plate spring 31 is secured to the inner surface of the operating member 10 by means of a fixing plate 32 and small screws 33. A coupling member 34 formed of a plastic material of low friction coefficient such as polyacetal is secured to an end of the plate spring 31. The coupling member 34 is designed such that when it bears against the inclined surface 20a of the keeper plate 20, it is downwardly displaced as indicated by dots-and-dash line and comes into engagement with an engaging slot 35 provided in the cam barrel 3. The coupling member 34 supported by the plate spring 31 and the keeper plate 20 together constitute connecting means, and the releasing plate 22 constitutes releasing means. Also, the connecting means and the releasing means together constitute an automatic connecting device.

In FIG. 5, the rightwardly inclined curved cam portions 13a, 14a and 15a of the cam slots 13, 14 and 15, respectively, formed in the cam barrel 3 are used for zoom magnification change, and the remaining rightwardly extending cam portions 13b, 14b and 15b are for the focusing in the macro area. In the cam portions for zooming, the angle of inclination of the cam slot 13 is greater than the angle of inclination of the cam slot 15, and the angle of inclination of the cam slot 14 is smaller than the angle of inclination of the cam slot 15. In the cam portions for the focusing in the macro area, the cam slot 13 has a great angle of inclination and the angle of inclination of the cam slot 14 is zero (0). The cam slot 15 is designed such that as shown in FIG. 7, the cam barrel 3 is displaced downwardly (rightwardly as viewed in FIG. 1) by x relative to the fixed pin 16 when the cam barrel 3 is rotated leftwardly.

The operation of the embodiment constructed as described above will now be described.

FIGS. 1 and 7 show the state when the operating member 10 has been moved (rightwardly as viewed in FIG. 1 and downwardly as viewed in FIG. 7) to the shortest focal length (wide angle) position along the optic axis and further focused on the infinity ($\infty$) position. In this state, the side surface of the first rotation limiting plate 24 bears against the limiting piece 28, as shown in FIG. 7. Also, the coupling member 34 of the automatic connecting device and the inclined end surface 20a of the keeper plate 20 are spaced apart from each other and therefore, the rotation of the operating member 10 is not transmitted to the cam barrel 3.

When the operating member 10 is slid leftwardly (upwardly as viewed in FIG. 7) along the optic axis from the position of FIG. 1, the movable barrel 2 coupled thereto through the thread 11 moves leftwardly with the operating member. In this case, the fixed pin 16 studded in the fixed lens barrel 1 is engaged with the straight guide groove 2c (see FIG. 5) of the movable barrel 2 and therefore, the movable barrel 2 does not rotate about the optic axis but moves rectilinearly. Thus, the first lens barrel 4 and the fourth lens barrel 6 coupled to the movable barrel 2 move as a unit leftwardly as viewed in FIG. 1 along the optic axis. Accordingly, the first lens group L1 and the fourth lens group L4 move leftwardly along the optic axis by equal amounts at the same time.

When the movable barrel 2 moves leftwardly as viewed in FIG. 1 with the operating member 10, the interlocking pin 17 studded in the movable barrel 2 moves upwardly as viewed in FIG. 5 (leftwardly as viewed in FIG. 1) and moves the cam barrel 3 upwardly through the sliding groove 3a. The fixed pin 16 engaged with the cam slot 15 of the cam barrel 3 is immovably secured to the fixed lens barrel 1 and therefore, the cam barrel 3 moves upwardly with the movable barrel 2 and at the same time rotates leftwardly as viewed in FIGS. 5 and 7 in accordance with the cam shape of the cam portion 15a (for zooming) of the cam slot 15. Accordingly, both of the cam slots 13 and 14 move obliquely leftwardly in accordance with the angle of inclination of cam portion 15a.

The angle of inclination of the cam portion 13a (for zooming) of the cam slot 13 relative to the direction of rotation (leftward direction) of the cam barrel 3 is greater than the angle of inclination of the cam portion 15a, and the angle of inclination of the cam portion 14a (for zooming) of the cam slot 14 is smaller than the angle of inclination of the cam portion 15a. Therefore, in accordance with the differences between the respective angles of inclination, the sliding pin 18 engaged with the cam slot 13 moves downwardly (rightwardly as viewed in FIG. 1) along the straight guide groove 1a and at the same time, the sliding pin 19 engaged with the cam slot 14 moves upwardly (leftwardly as viewed in FIG. 1) along the straight guide groove 1b.

Figure 8:
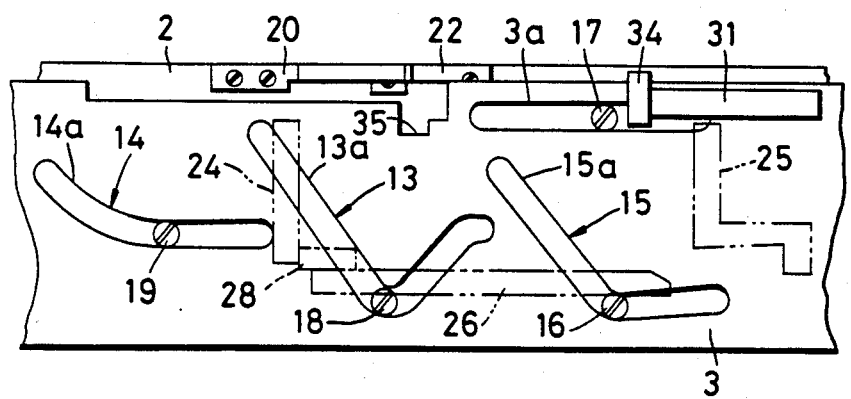

Accordingly, when the operating member 10 is slid leftwardly as viewed in FIG. 1, the first lens group L1 and the fourth lens group L4 move leftwardly with the operating member 10 and at the same time, the second lens group L2 and the third lens group L3 move rightwardly and leftwardly, respectively, and the focal length of the zoom lens gradually changes from the shortest focal length to the long focal length. Thus, zooming is effected in response to the movement of the operating member 10. Also, when the operating member 10 moves leftwardly as viewed in FIG. 1 and arrives at the telephoto position, the rectilinear movement limiting plate 26 secured to the operating member 10 moves upwardly as viewed in FIG. 7 and bears against the limiting piece 28, as shown in FIG. 8, whereby the movement thereof is blocked. At this time, the sliding pin 18, the sliding pin 19 and the fixed pin 16 arrive at the bent portions of the cam slots 13, 14 and 15, respectively, and the combined focal length of the zoom lens optical system L1-L4 becomes maximum.

Focusing will now be described in detail. First focussing in the normal photography area will be described.

When the operating member 10 is rotated about the optic axis in the movement area along the optic axis, except the telephoto position of the operating member 10, the rotation thereof is controlled by the limiting plate 24 bearing against the limiting piece 28 of the cover barrel 29 as shown in FIG. 7. Also, when the operating member 10 is rotated to the close distance side, the rotation thereof is blocked by the limiting plate 25 moving leftwardly as viewed in FIG. 7 and the bearing surface 25a bearing against the limiting piece 28.

Also, when the operating member 10 is rotated, the lens barrel 4 rotates about the optic axis through the intermediary of the pin 12 fitting in the straight groove 10a of the operating member 10. By this rotation, the first lens group L1, together with the lens barrel 4, is moved in the direction of the optic axis while being rotated in accordance with the lead of the helicoid thread 5 and thus, focusing in the normal photography area is accomplished.

Focussing during photography in the macro area will now be described.

Figure 9:
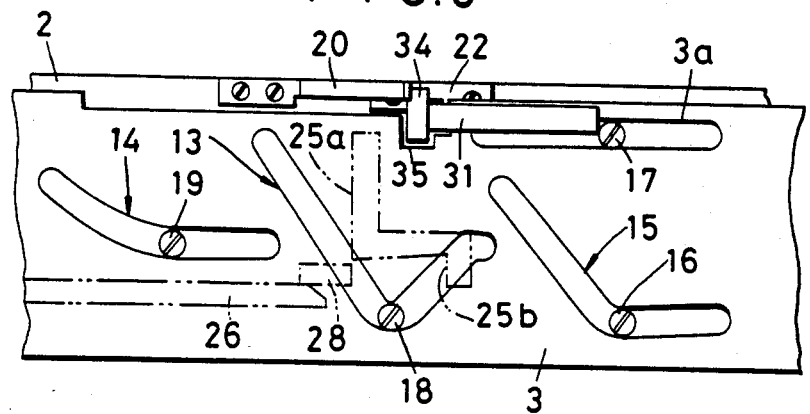

In the above-described embodiment, macro photography becomes possible where the operating member 10 is axially moved to the telephoto position and thereafter the operating member 10 is further rotated beyond the normal close distance position. FIG. 9 shows the state in which the operating member 10 has been axially moved to the telephoto position and further the operating member 10 has been rotated to the normal close distance position.

As shown in FIG. 7, the length of the bearing surface 25a of the limiting plate 25 is shorter than the length of the limiting plate 24, and the width W of the limiting piece 28 is slightly narrower than the spacing l. Therefore, when the operating member 10 is at any other position on the optic axis than the telephoto position, the bearing surface 25a of the limiting plate 25 bears against the limiting piece 28 and thus, it is impossible to rotate the operating member 10 beyond the normal close distance position. However, in the state as shown in FIG. 9 wherein the rectilinear movement limiting plate 26 is in contact with the limiting piece 28, that is, the operating member 10 is axially moved to the telephoto position, the limitation of the normal close distance position is lacking and therefore, the bearing surface 25a shown in FIG. 9 does not bear against the limiting piece 28 but becomes leftwardly displaceable. Accordingly, only in the telephoto position, the operating member 10 rotates beyond the normal close distance position and stops its rotation when it arrives at the macro close distance position whereat the bearing surface 25b of the limiting plate 25 bears against the limiting piece.

When the operating member 10 rotates to the normal close distance position and the limiting plate 25 comes to a position proximate to the limiting piece 28 as shown in FIG. 9, the coupling member 34 secured to the end of the plate spring 31 comes close to the inclined surface 20a of the keeper plate 20, as shown in FIG. 6. Also, when the operating member 10 is axially moved to the telephoto position, the cam barrel 3 rotates in accordance with the cam shape of the cam slot 15 and the engaging slot 35 formed in the cam barrel 3 is placed between the inclined surface 20a of the keeper plate 20 and the protruding inclined surface 22a of the releasing plate 22.

Figure 10:
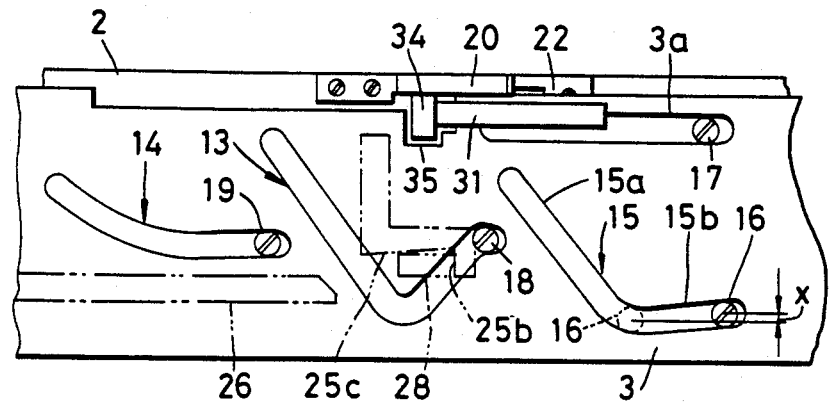

When the operating member 10 further rotates toward the macro close distance position (in the direction of the arrow indicated in FIG. 6) beyond the normal close distance position, the end surface of the coupling member 34 bears against the inclined surface 20a of the keeper plate 20 fixed to the movable barrel 2, and the coupling member 34 is depressed downwardly as viewed in FIG. 6 along the inclined surface 20a against the biasing force of the plate spring 31 and fits into the engaging slot 35 of the cam barrel 3 as indicated by the dots-and-dash line. By this engagement of the coupling member 34 with the engaging slot 35, the cam barrel 3 and the operating member 10 are connected to each other, so that the bearing surface 25b of the limiting plate 25 rotates leftwardly until it bears against the limiting piece 28. At that time, the keeper plate 20 covers the coupling member 34, thereby preventing the coupling member 34 from being disengaged from the engaging slot 35. In this macro area, the bearing surface 25c of the limiting plate 25 is brought into contact with the limiting piece 28, as shown in FIG. 10, and therefore the movement of the operating member 10 in the direction of the optic axis becomes impossible. Accordingly, in the case of macro photography, zooming cannot be effected.

When the operating member 10 is rotated to the macro close distance position at which the bearing surface 25b bears against the limiting piece 28, the cam slots 13, 14 and 15 of the cam barrel 3 rotatable with the operating member 10 rotate leftwardly from the position of FIG. 9 to the position of FIG. 10. Therefore, the second lens group L2 greatly moves relative to the other lens groups in the direction opposite to the direction of movement for zooming in accordance with the cam shape of the cam slot 13. Thus, focusing can be effected to the close distance in the very proximate macro area to thereby accomplish macro photography.

When the photography area is to be changed over from the macro area to the normal photography area, the operating member 10 is rotated toward the infinity position in the normal photography area (in the direction opposite to the arrow in FIG. 6). Therefore, the coupling member 34 moves upward along the protruding inclined surface 22a and becomes disengaged from the engaging slot 35. At this time, by the restitutional force of the plate spring 31, the coupling member 34 is further moved upward and returned to a position indicated by the solid line. Also the bearing surface 25c of the limiting plate 25 becomes disengaged from the limiting piece 28. Accordingly, focusing is changed over from the macro area to the normal photography area and zooming becomes possible.

Where the operating member 10 and the cam barrel 3 are connected together through the coupling member 34 and the engaging slot 35 as described above, the coupling member 34 slides on the inclined end surface of the keeper plate 20 and is urged against the engaging slot 35 by the underside of the keeper plate 20. Also, when the connection between the cam barrel 3 and the operating member 10 is released, the coupling member 34 becomes disengaged from the engaging slot 35 and therefore, the coupling member 34 is urged against the protruding inclined surface 22a of the releasing plate 22. Therefore, the magnitude of the friction produced between the coupling member 34 and the engaging slot 35 during the connection and the release thereof, particularly during the release of the connection, greatly affects the change-over rhythm during the change-over of the photography area. In the above-described embodiment, in order to smooth the change-over rhythm, polyacetal of small friction coefficient is used as the material of the coupling member 34 to thereby minimize the friction resistance.

Figure 11:
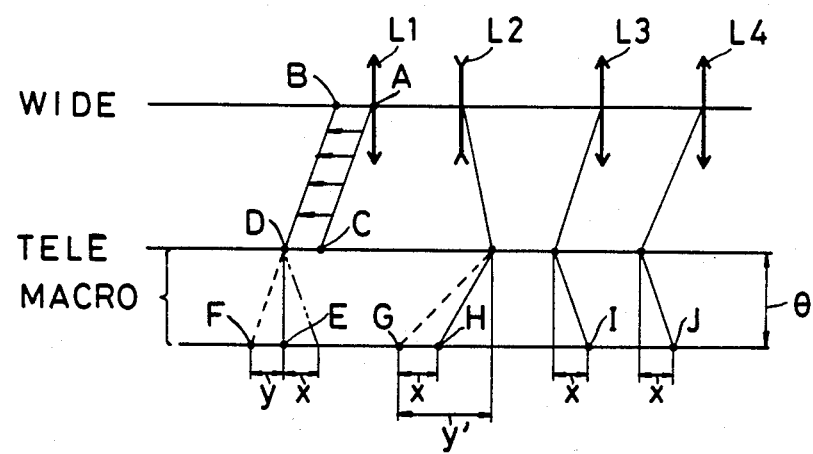
FIG. 11 is an optical system arrangement diagram showing the moved state of the optical system of the embodiment of FIG. 1.

FIG. 11 shows the movement of each lens group in the embodiment of FIG. 1. Point A represents the infinity ($\infty$) position of the first lens group L1 in the wide angle (shortest focal length) state, point B represents the normal close distance position of the first lens group L1 in the wide angle state, point C represents the infinity ($\infty$) position of the first lens group L1 in the telephoto (longest focal length) state, and point D represents the normal close distance position of the first lens group L1 in the telephoto state.

The first lens group L1 is moved within the range encircled by the points A, B, C and D, by zooming and focusing in the normal photography area. Focusing in the normal photography area is accomplished by the first lens group L1 being axially moved in accordance with the lead of the helicoid thread 5, but when the first lens group enters the macro area $\theta$, as previously described, focusing in the macro area is accomplished by the operating member 10 being operatively associated with the cam barrel 3. In this case, as shown in FIG. 10, the cam portion 15b for macro area focusing is inclined rightwardly upwardly and therefore, when the cam barrel 3 is rotated leftwardly so that the fixed pin 16 arrives at the macro close distance position indicated by the solid line from the position indicated by the dots-and-dash line, the cam barrel 3 moves downwardly as viewed in FIG. 10 (rightwardly as viewed in FIG. 1) by an amount x while rotating in accordance with the inclination of the cam portion 15b of the cam slot 15.

By this downward movement of the cam barrel 3, the movable barrel 2 is moved by x rightwardly as viewed in FIG. 1 through the sliding groove 3a and the interlocking pin 17. Accordingly, with the movable barrel 2, the fourth lens group L4 moves by x as shown in FIG. 11.

On the other hand, the amount of movement of the first lens group L1 is the difference of the amount of axial movement y thereof from the normal close distance position D by the helicoid thread 5 and the amount of displacement x of the cam barrel 3. Accordingly, if the cam portion 15b of the cam slot 15 is inclined so that $y \leq x$, the first lens group L1 will not come out forwardly of the close distance position D in the telephoto state. In the embodiment of FIG. 1, the cam portion 15b of the cam slot 15 is inclined in the direction opposite to the cam portion 15a for zooming so that during focusing in the macro area, the first lens group L1 does not move from the normal close distance position D in the telephoto state, whereby the amount of movement x of the first lens group L1 and the amount of axial movement y thereof by the helicoid thread 5 are offset by each other.

In this case, as shown in FIG. 11, the amount of axial movement y of the first lens group L1 by the helicoid thread 5 and the amount of return x thereof by the cam slot 15 are in the relation that $x = y$, and the first lens group L1 is returned from point F to point E. If the first lens group L1 is not returned by the cam slot 15 (if, for example, the inclination of the cam portion 15b is zero), curvature of the image field will greatly vary in the positive direction in the marginal portion of the image plane of the lens and a sharp image will become difficult to obtain. Therefore, if the cam portion 15b is formed so that $y \leq x$, the aberrations, particularly curvature of the image field, of the optical system resulting from the first lens group L1 being moved forwardly beyond the normal close distance position in the telephoto state can be corrected.

Also, the second lens group L2 is greatly displaced leftwardly by the cam portion 13b (see FIG. 5) of the cam slot 13 and tends to move by y' to point G as indicated by the dotted line in FIG. 11, but is returned by x by the cam portion 15b of the cam slot 15 and moves to point H as indicated by the solid line. Also, the third lens group L3, with the fourth lens group L4, moves rightwardly by x as indicated by the solid lines, and the third lens group L3 and the fourth lens group L4 arrive at point I and point J, respectively. As described above, in focusing in the macro area, the first lens group L1 is immovably placed at the normal close distance position in the telephoto state, the second lens group L2 is displaced leftwardly and the third lens group L3 and the fourth lens group L4 are displaced rightwardly at the same time, whereby focusing in the macro area can be accomplished to a very proximate position without the aberrations of the optical system being aggravated.

I claim:

1. A zoom lens assembly comprising:
    an optical system forming an optic axis and having a lens group moved along said optic axis for zooming and for focusing on an object to be photographed more proximate than an object lying at a normal object distance;
    a barrel member coupled to said lens group and rotatable about said optic axis to thereby move said lens group;

an operating member moved along said optic axis for a zooming operation and rotated about said optic axis for a focusing operation, said operating member having a close-up operation area in which said operating member is rotated during focusing on said object to be photographed more proximate than the object lying at said normal object distance;

means for rotating said barrel member in response to said zooming operation of said operating member; and a connecting device provided between said barrel member and said operating member, said connecting device having an engaging slot and a coupling member that is fitted into said engaging slot in response to the rotation of said operating member into said close-up operation area to couple said barrel member to said operating member for rotation therewith, said coupling member being disengaged from said engaging slot in response to the rotation of said operating member away from said close-up operation area.

2. A zoom lens assembly according to claim 1, wherein said rotating means includes a movable member moved along said optic axis in response to said zooming operation of said operating member, means for coupling said barrel member to said movable member for movement therewith along said optic axis, and means for rotating said barrel member relative to said movable member in response to the movement of said movable member.

3. A zoom lens assembly according to claim 1, wherein said coupling member is formed of plastic material.

4. A zoom lens assembly according to claim 1, wherein said connecting device maintains the fitting of said coupling member into said engaging slot while said operating member is in said close-up operation area.

5. A zoom lens assembly according to claim 1, wherein said engaging slot is formed in said barrel member, and said coupling member is mounted on said operating member.

6. A zoom lens assembly according to claim 5, wherein said connecting device has a spring member for mounting said coupling member on said operating member.

7. A zoom lens assembly according to claim 6, wherein said connecting device also has first and second inclined surfaces opposed to said engaging slot when said barrel member is in a predetermined rotated position, said first inclined surface acts to urge said coupling member toward said engaging slot when said operating member is rotated into said close-up operation area, and said second inclined surface acts to urge said coupling member in the direction opposite to said engaging slot when said operating member is rotated out of said close-up operation area.

8. A zoom lens assembly comprising:

an optical system forming an optic axis and having a plurality of lens groups, said optical system including a first movable lens group movable along said optic axis for focusing at a normal object distance and a second movable lens group movable along said optic axis for zooming and for focusing on an object to be photographed more proximate than an object lying at said normal object distance;

operating means rotatable about said optic axis, said operating means having a normal operation area for focusing at said normal object distance and a close-up operation area for focusing on a more proximate object to be photographed;

means for converting the rotation of said operating means in a predetermined direction into movement of said first movable lens group in a first direction along said optic axis; and means for converting the rotation of said operating means in said predetermined direction into movement of said first movable lens group in a second direction along said optic axis opposite to said first direction when said operating means is in said close-up operation area, whereby said first movable lens group is moved along said optic axis by an amount corresponding to the difference between said movement of said first movable lens group in said first direction and said movement of said first movable lens group in said second direction.

9. A zoom lens assembly according to claim 8, wherein the amounts of movement of said first movable lens group in said first direction and said second direction are equal to each other, whereby said first movable lens group is not moved in the direction of the optic axis during the rotation of said operating means which is in said close-up operation area.

10. A zoom lens assembly according to claim 6, wherein the first-mentioned converting means includes a holding barrel for holding said first movable lens group, a movable barrel threadably coupled to said holding barrel, and means for imparting relative rotation between said holding barrel and said movable barrel in response to the rotation of said operating means, and the second-mentioned converting means includes means for moving said movable barrel along the optic axis in response to the rotation of said operating means.

11. A zoom lens assembly according to claim 8, wherein said operating means is moved along said optic axis for zooming.

* * * * *